(12) United States Patent
Nakaike et al.

(10) Patent No.: US 7,415,383 B2
(45) Date of Patent: Aug. 19, 2008

(54) COMPILING METHOD, APPARATUS, AND PROGRAM

(75) Inventors: Takuya Nakaike, Yokohama (JP); Hideaki Komatsu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 11/291,632

(22) Filed: Dec. 1, 2005

(65) Prior Publication Data

US 2007/0079002 A1  Apr. 5, 2007

(30) Foreign Application Priority Data

Dec. 1, 2004  (JP) ............................. 2004-349008

(51) Int. Cl.
*G06F 19/00* (2006.01)
*G06F 17/40* (2006.01)

(52) U.S. Cl. .............................. 702/182; 700/9; 700/28; 700/40; 702/186; 702/187; 702/188; 702/189; 712/220; 712/229

(58) Field of Classification Search ...................... 700/9, 700/28, 33, 34, 36, 40, 90; 702/1, 127, 182, 702/186, 187, 188, 189, 199; 712/220, 229; 713/300, 310, 320, 322, 330, 600

See application file for complete search history.

(56) References Cited

U.S. PATENT DOCUMENTS

| | | | | |
|---|---|---|---|---|
| 2,883,255 A | * | 4/1959 | Anderson | 346/34 |
| 3,478,328 A | * | 11/1969 | Schillinger | 702/199 |
| 3,505,606 A | * | 4/1970 | Werner | 327/50 |
| 4,912,496 A | * | 3/1990 | Tamada et al. | 396/96 |
| 5,287,459 A | * | 2/1994 | Gniewek | 711/111 |
| 5,459,837 A | * | 10/1995 | Caccavale | 709/226 |
| 5,764,961 A | * | 6/1998 | Bhat | 703/21 |
| 5,812,780 A | * | 9/1998 | Chen et al. | 709/224 |

(Continued)

FOREIGN PATENT DOCUMENTS

JP  56-164986 A  * 12/1981

(Continued)

OTHER PUBLICATIONS

"Statistical Polling Method": IBM Technical Disclosure Bulletin, Jun. 1, 1986, vol. 29, No. 1, pp. 293-295.*

(Continued)

*Primary Examiner*—Edward R Cosimano
(74) *Attorney, Agent, or Firm*—Louis P. Herzberg

(57) ABSTRACT

Brings response time of a Web server and the like closer to a targeted value. A controller controlling the average response time elapsed between reception by information processing apparatus of a processing request and response of information processing apparatus to the processing request. The controller including: a section for obtaining a response time goal which is a target value of the average response time; a section for calculating a predicted response time which is a predicted value of the average response time at the time point when a predetermined reference period has elapsed from setting an operation mode in the information processing apparatus, the operation mode being any of a plurality of operation modes which provide different throughputs; and a section for setting the operation mode in the information processing apparatus if predicted response time calculated by the predicted response time calculating section is less than goal.

15 Claims, 10 Drawing Sheets

U.S. PATENT DOCUMENTS

| | | | |
|---|---|---|---|
| 6,279,039 B1 * | 8/2001 | Bhat et al. | 709/226 |
| 6,321,264 B1 * | 11/2001 | Fletcher et al. | 709/224 |
| 6,728,957 B1 | 4/2004 | Nakazato | |
| 7,146,353 B2 * | 12/2006 | Garg et al. | 707/2 |
| 7,185,237 B2 * | 2/2007 | Stephenson et al. | 714/47 |
| 2002/0055980 A1 * | 5/2002 | Goddard | 709/217 |
| 2002/0055982 A1 * | 5/2002 | Goddard | 709/217 |
| 2002/0055983 A1 * | 5/2002 | Goddard | 709/217 |
| 2005/0021530 A1 * | 1/2005 | Garg et al. | 707/100 |
| 2005/0060598 A1 * | 3/2005 | Klotz et al. | 714/4 |
| 2005/0102398 A1 * | 5/2005 | Zhang et al. | 709/225 |
| 2005/0193113 A1 * | 9/2005 | Kokusho et al. | 709/225 |
| 2006/0005086 A1 * | 1/2006 | Stephenson et al. | 714/47 |
| 2008/0046558 A1 * | 2/2008 | Raja et al. | 709/224 |
| 2008/0071906 A1 * | 3/2008 | Thoenes et al. | 709/224 |

FOREIGN PATENT DOCUMENTS

| | | |
|---|---|---|
| JP | 05-324258 | 12/1993 |
| JP | 2000-276361 | 6/2000 |
| JP | 2000276361ABS | 6/2000 |
| JP | 2004152068 | 5/2004 |

OTHER PUBLICATIONS

Intel Pentium M Processor, Apr. 2004, pp. 1-75.
Energy COnservation Policies For Web Servers, Elnozahy et al, Low Power Computing Research Center, IBM Research.
Increasing IT Responsiveness and Efficiency With IBM WebSphere Extended Deployment, pp. 2-27.
Self-Optimization In Computer Systems via Online Control: Application to Power Management, Kandasamy et al, ISIS, Vanderbilt University.

* cited by examiner

[Figure 1]
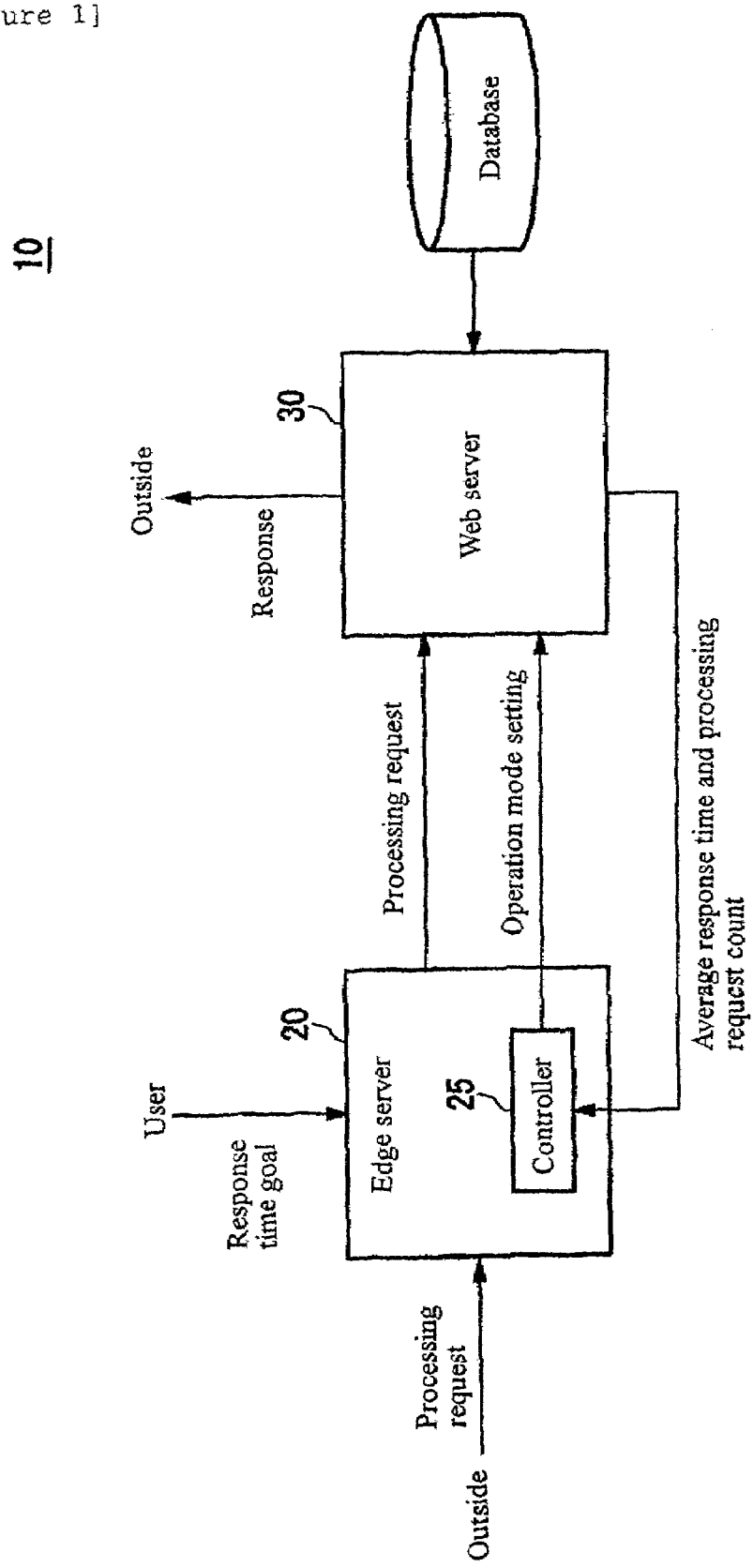

[Figure 2]
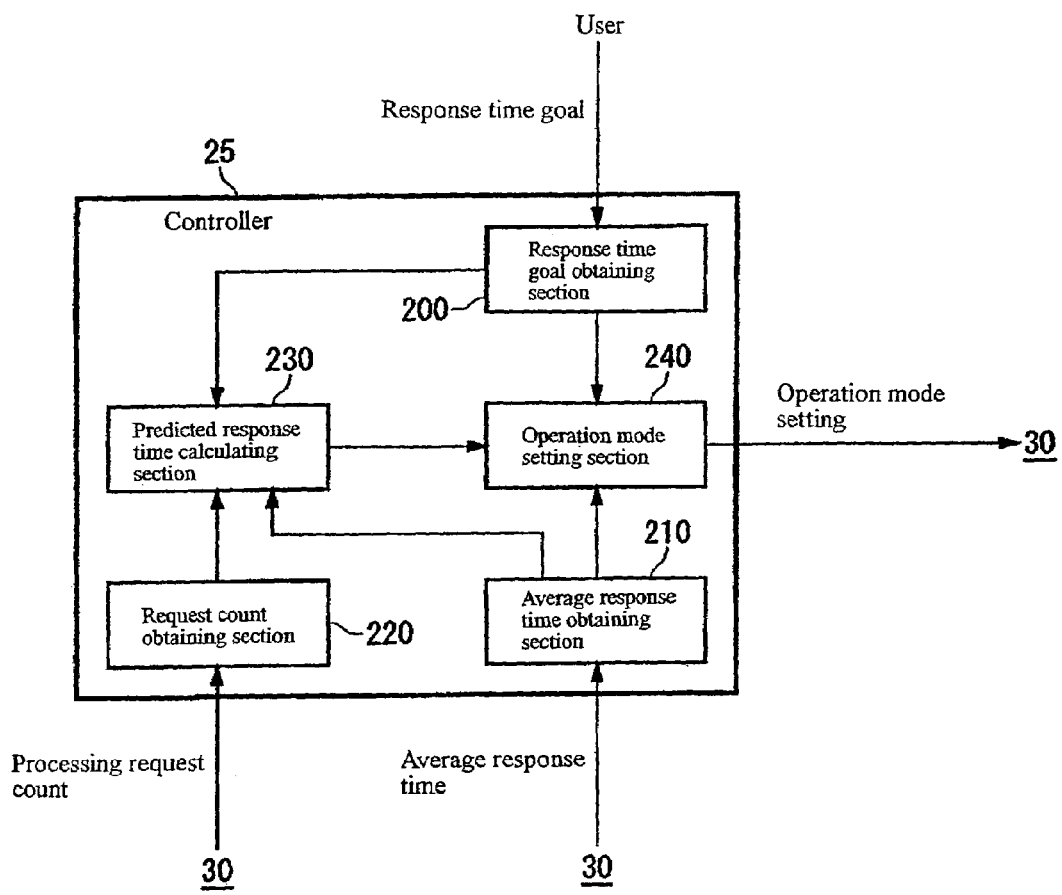

[Figure 3]
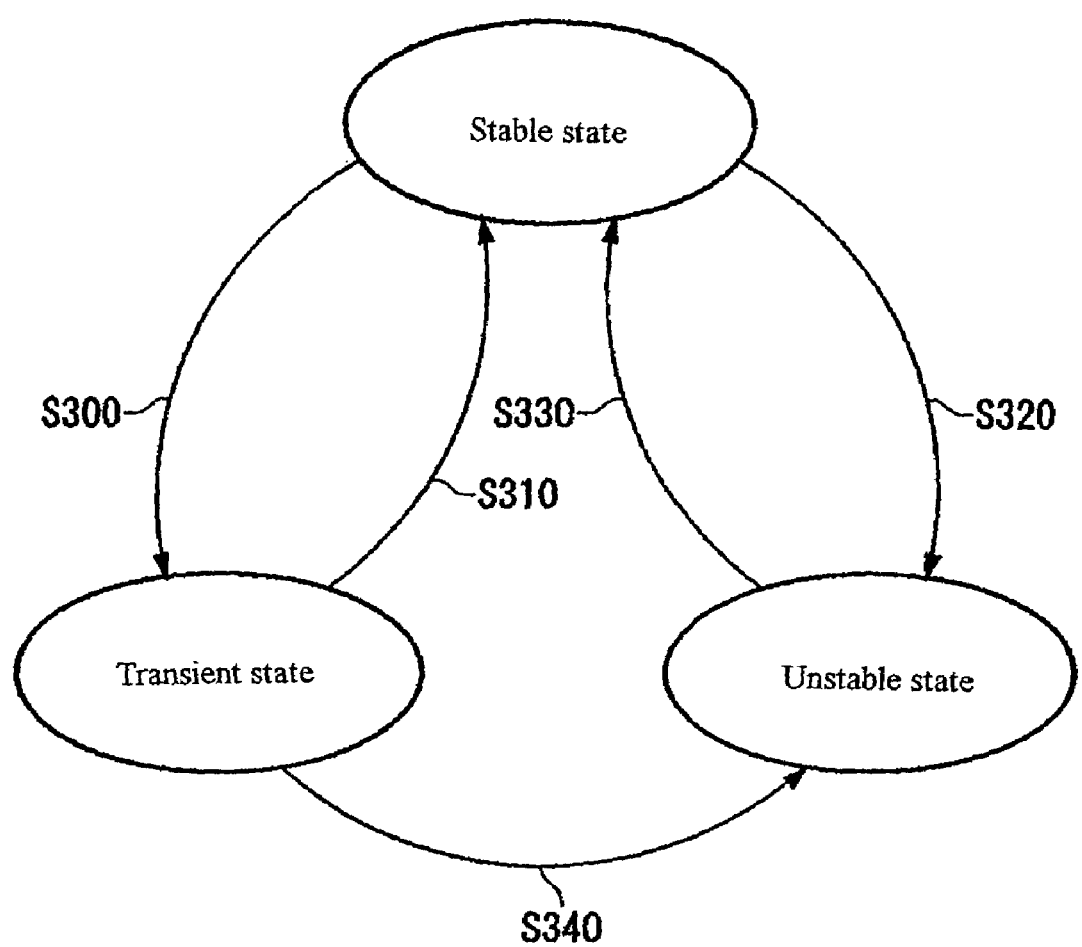

[Figure 4]
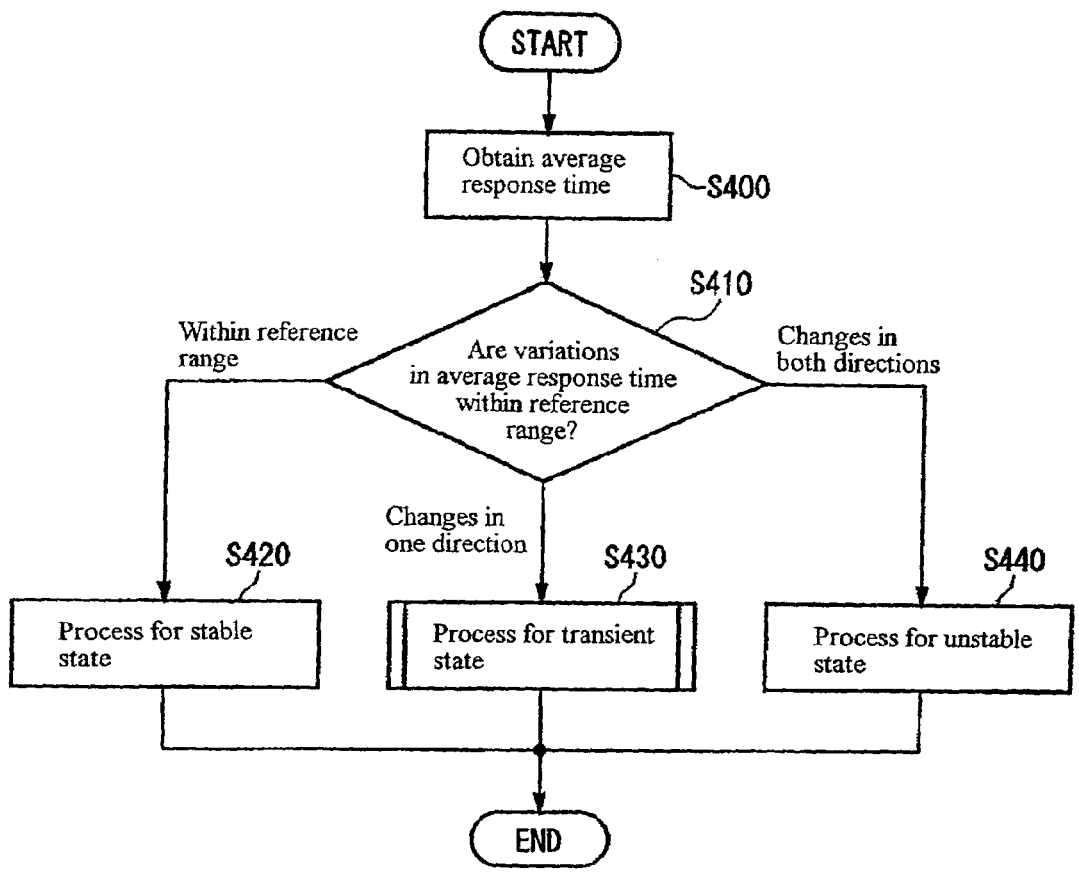

[Figure 5]
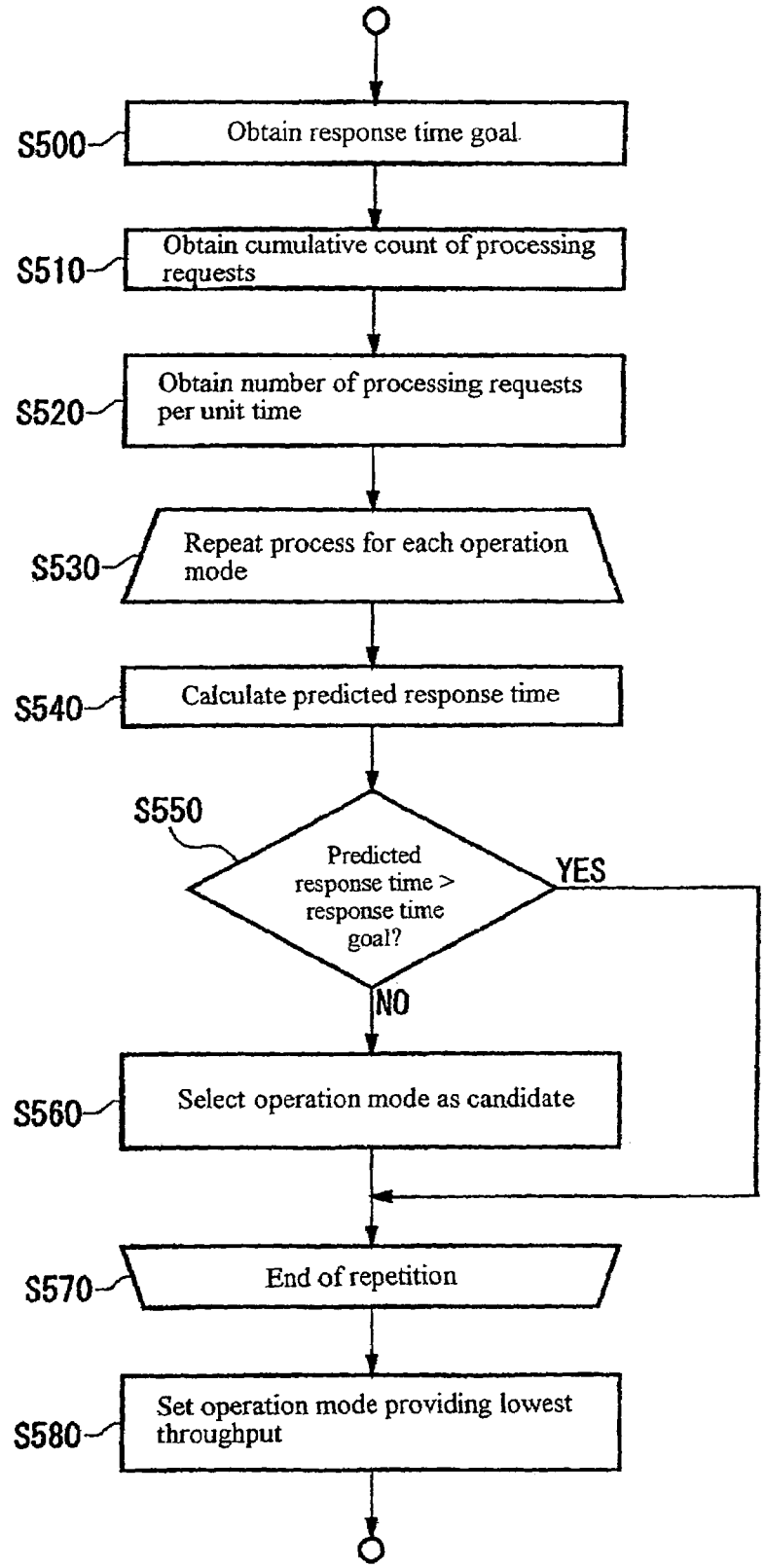

[Figure 6]
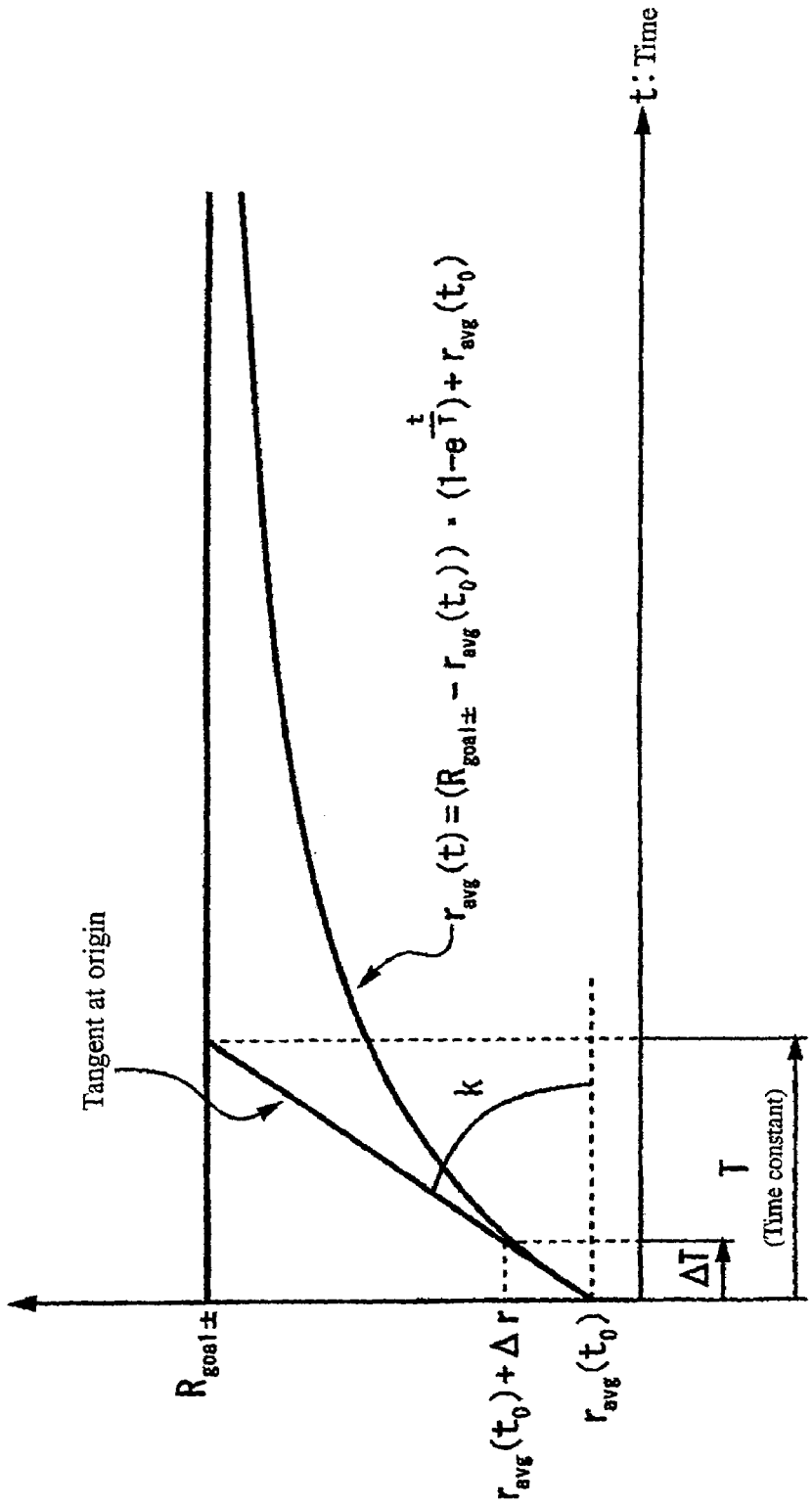

[Figure 7]
(a)
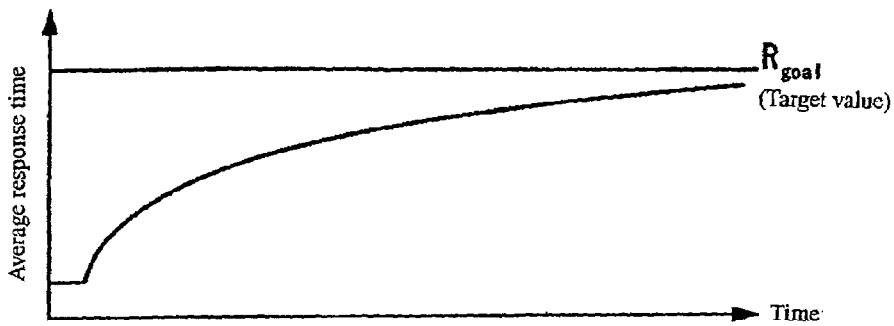
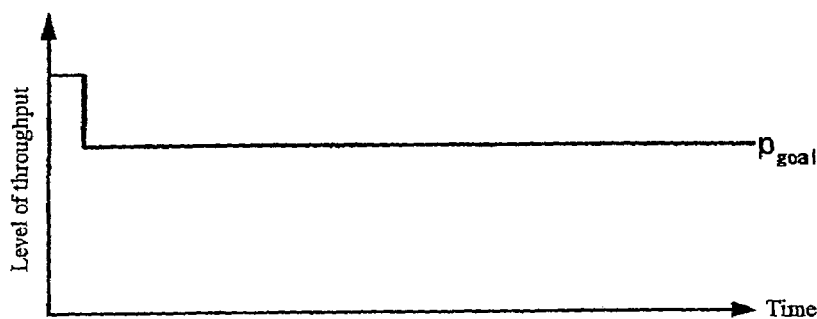
(b)
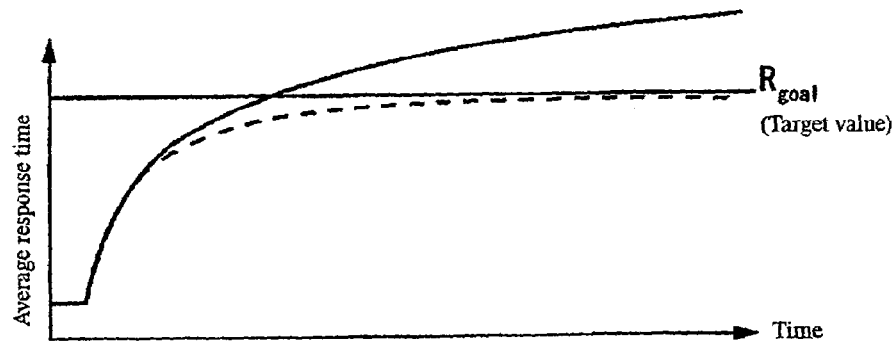
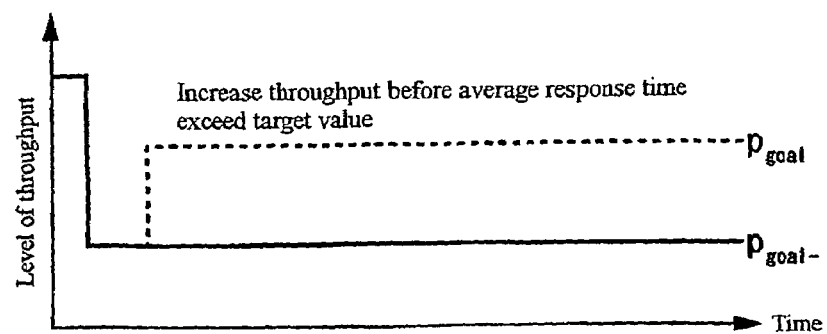

[Figure 8]
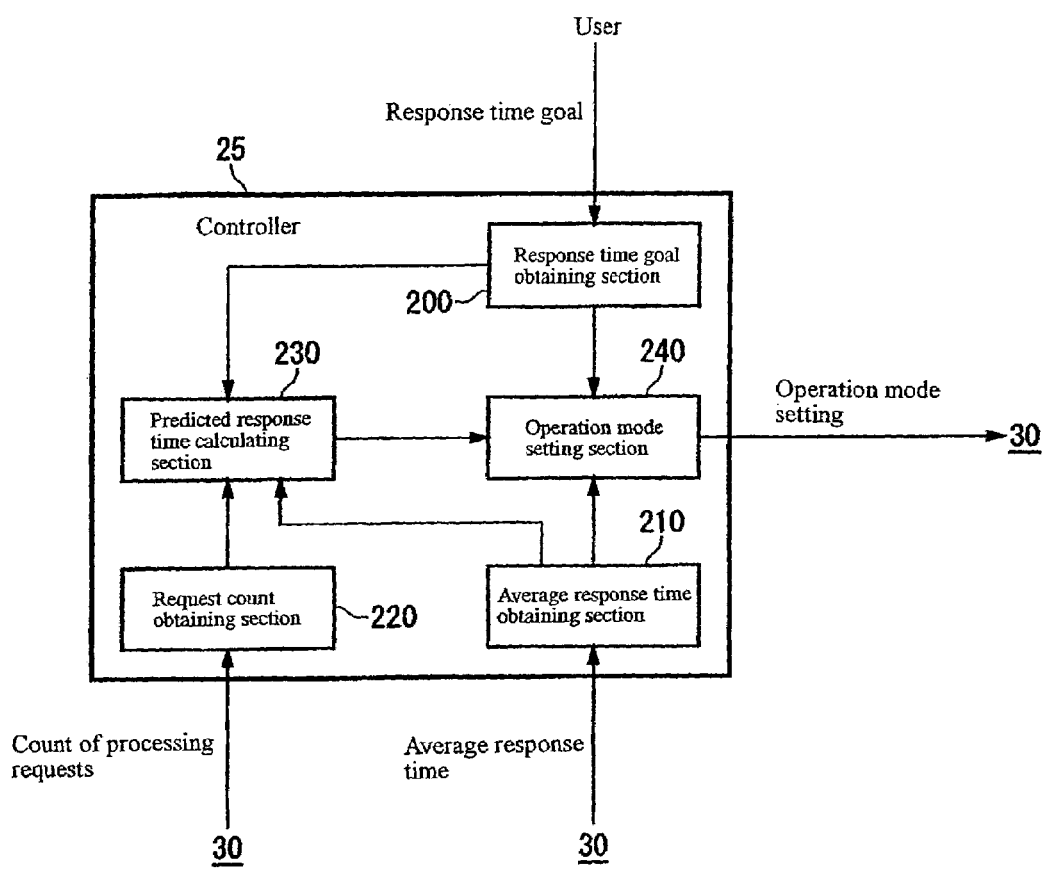

[Figure 9]
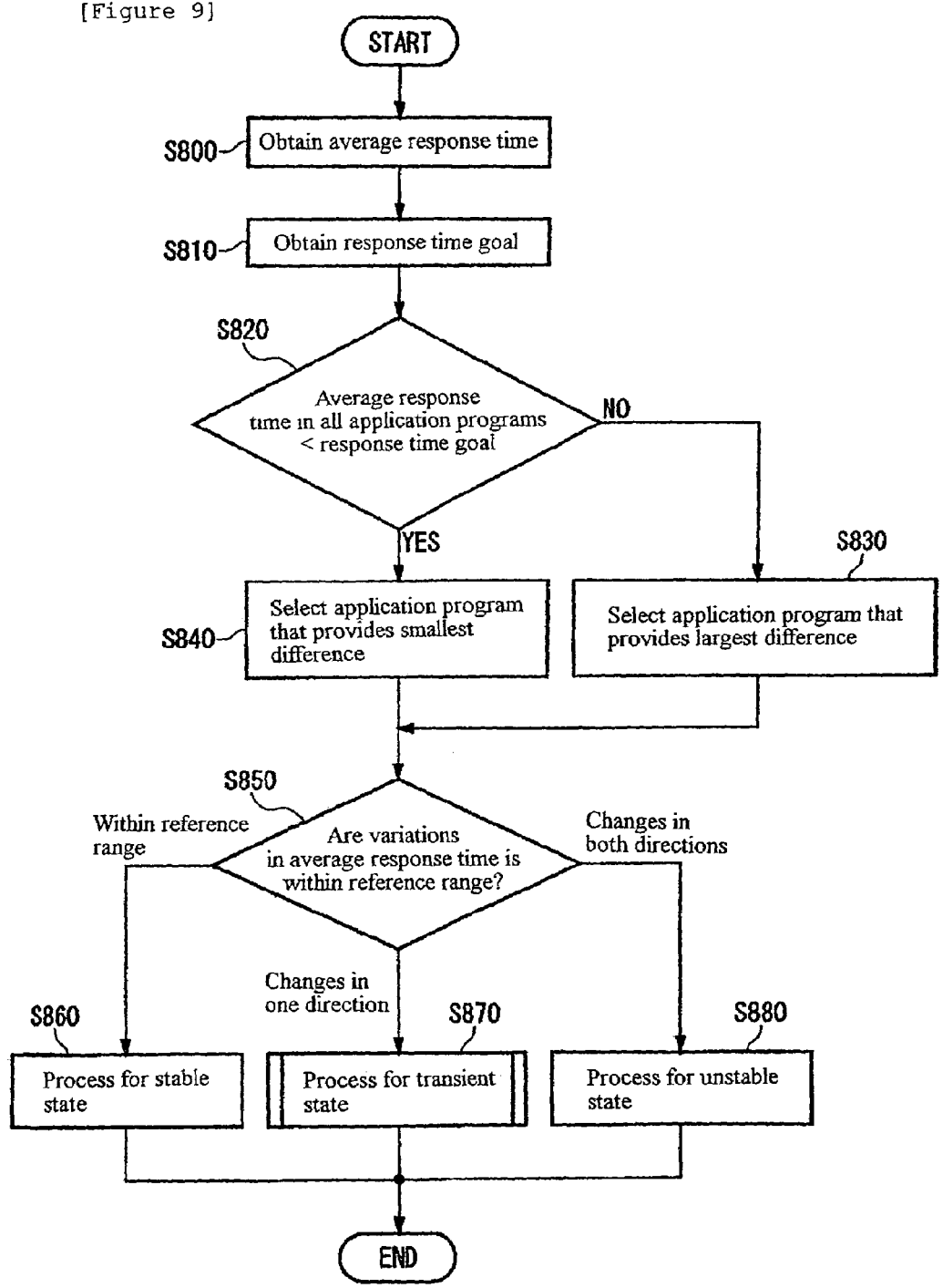

[Figure 10]
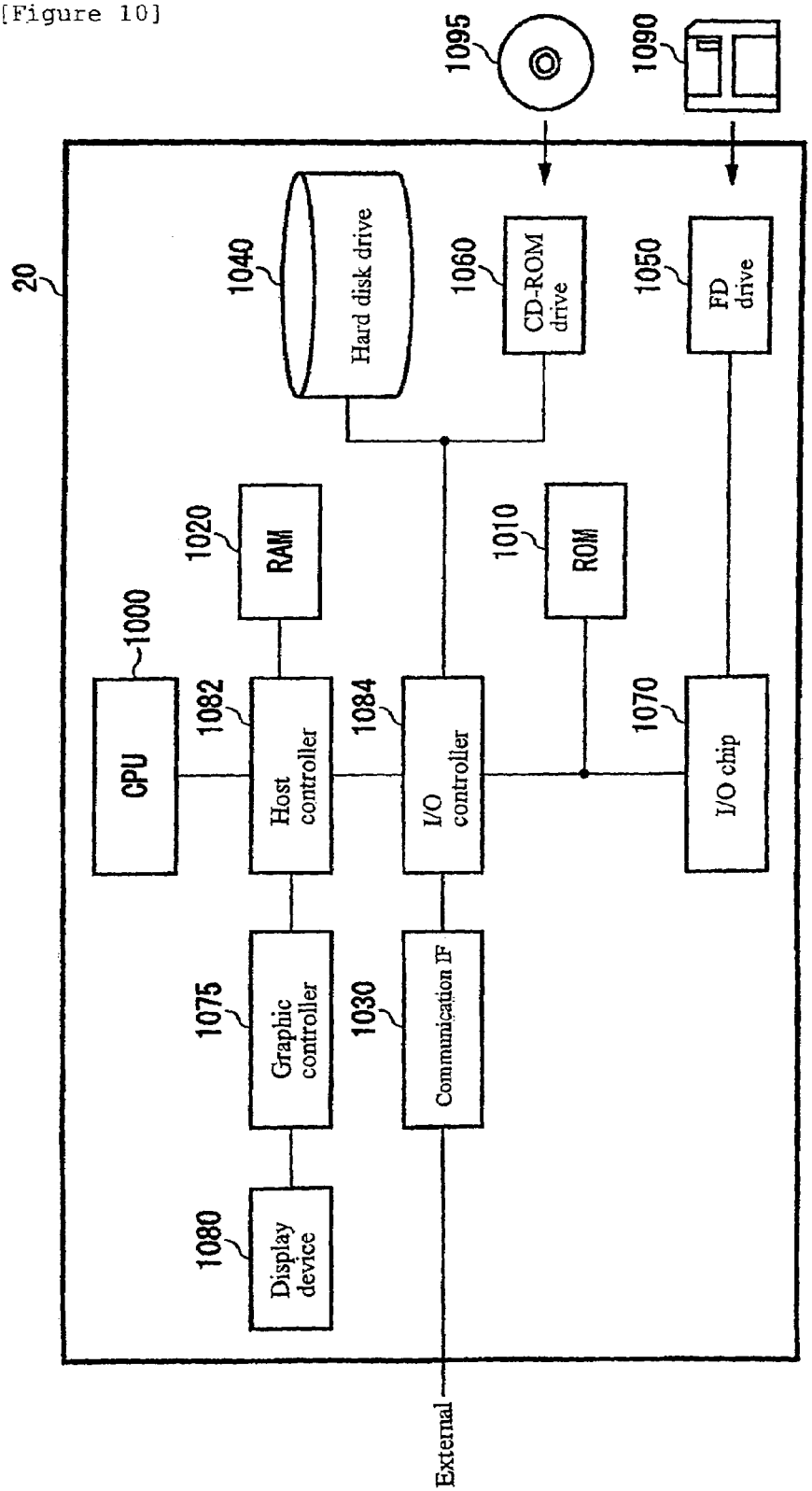

COMPILING METHOD, APPARATUS, AND PROGRAM

FIELD OF THE INVENTION

The present invention relates to a controller, an information processing system, a control method, and a program. In particular, the present invention relates to a controller, an information processing system, a control method, and a program which control the average response time that elapses between the reception by the information processing apparatus of a processing request and the response of the information processing apparatus to the processing request.

BACKGROUND ART

In these years attention is being given to power saving techniques aiming at reducing heat generation in information apparatuses. The following documents are considered:

[Non-Patent Document 1) "Intel® Pentium® Processor Enhanced Intel SpeedStep Technology", Webpage URL:://support.intel.com/support/processors/mobile/pm/sb/CS007981.htm

[Non-Patent Document 2] M. Elnozahy, M. Kistler, and R. Rajamony, "EnergyConservation Policies for Web Servers", USITS 2003

[Non-Patent Document 3] N. Kandasamy, S. A. Abdelwahed and J. P. Hayes, "Self-Optimization in Computer Systems via Online Control: Application to Power Management", In Proceedings of the International Conference on Autonomic Computing, 2004

[Non-Patent Document 4] "WebSphere® Extended Deployment Edition", Whitepaper,WebpageUIRL: 6.ibm.com/jp/software/websphere/ft/was/xd/pdf/whitepaper.pdf A technique for changing the operating frequency or voltage of central processing units has been used (for example see Non-Patent Document 1). In order to reduce energy consumption in a Web server by using this technique, another technique has been proposed that controls the operating frequency of the Web server on the basis of a 90% response time of the Web server (see Non-Patent Document 2).

The term "90% response time" as used in that document refers to the time required for a Web server to respond to 90% of the processing requests sent to the Web server. The 90% response time is used as a measure of how quickly the Web server can perform processing. According to the technique, the 90% response time is measured at regular time intervals. If the measured value is less than a target value, the operating frequency is reduced; if the measured value exceeds the target value, the operating frequency is increased. This allows the target to be achieved while preventing excessive power consumption.

A technique that controls the operating frequency of a Web server in accordance with the number of processing requests to the Web server has been proposed (see Non-Patent Document 3). According to the technique, the trend in recent variations in the incoming rate of processing requests is determined from the difference between the incoming rate of processing requests previously measured and the incoming rate of processing requests currently measured and a predicted value of the feature average response time is calculated on the basis of this trend. Then, the lowest operating frequency that can maintain the average response time less than a target value is set. Thus, if variations in the processing request incoming rate show a given trend, appropriate control can be performed.

The present invention solves the following problems. Because the 90% response time is determined on the basis of response times over a period between a predetermined past time and the present time, there is a time lag between the change of the operating frequency and a change in the 90% response time. Therefore, the 90% response time in the technique described in Non-Patent Document 1 can fluctuate around the target value. The technique described in Non-Patent Document 1 enables operating frequency control at very short time intervals by including the function of monitoring TCP/IP packets to measure the 90% response time and the function of controlling the operating frequency in the kernel of an operating system. Accordingly, the range of fluctuation is relatively narrow.

However, because it is difficult to identify the types of processing requests at the level of TCP/IP packets, only one response time goal can be addressed for all application programs running on a Web server. This is unrealistic and it is desirable that a response time goal be set for each application program. In fact, the technique described in Non-Patent Document 4 allows a response time goal to be set for each individual application program.

To address more than one target values, processing requests must be monitored at a higher level such as the HTTP. HTTP requests are monitored in user space. Measurement of the response time and operating frequency control in user space use a greater overhead than in kernel space. Accordingly, if operating frequency control is performed at short time intervals, the performance of Web applications would be decreased significantly.

If a response time goal is provided to a workload manager external to a Web server as in the technique described in Non-Patent Document 4, the operating frequency of the Web server must be controlled externally through a network. Accordingly, further overhead is consumed. Therefore, it is difficult to set time intervals for controlling the operating frequency to a small value on the order of several tens of seconds and the operating frequency must be controlled at longer time intervals.

If the technique described in Non-Patent Document 2 is applied to such a system without modification, time intervals for measuring the 90% response time will become considerably long. As a result, the 90% response time can fluctuate in limits far away from the target value. This holds true also for the technique described in Non-Patent Document 3. If operating frequency control is performed at long time intervals, the average response time can fluctuate.

SUMMARY OF THE INVENTION

Thus, the present invention provides control apparatus, information processing systems, control methods, and programs that can solve the problems. This is achieved by a combination of features set forth in the independent claims. The dependent claims define further advantageous specific embodiments.

In order to solve the problems, the first aspect of the present invention provides a controller for controlling the average response time that elapses between the reception by an information processing apparatus of a processing request and the response of the information processing apparatus to the processing request, the controller comprising: a response time goal obtaining section for obtaining a response time goal which is a target value of the average response time; a predicted response time calculating section for calculating a predicted response time which is a predicted value of the average response time at the time point when a predetermined reference period has elapsed from setting an operation mode in the information processing apparatus, the operation mode being any of a plurality of operation modes which provide different throughputs; and an operation mode setting section for setting the operation mode in the information processing apparatus if the predicted response time calculated by the predicted response time calculating section is less than the response time goal. Therefore, according to the present invention, the response time of a Web server and the like can be brought closer to a target value by reduced overhead.

The summary of the invention provided above does not enumerate all essential features of the present invention. Subcombinations of the features also can constitute the present invention.

BRIEF DESCRIPTION OF THE DRAWINGS

These and other aspects, features, and advantages of the present invention will become apparent upon further consideration of the following detailed description of the invention when read in conjunction with the drawing figures, in which:

FIG. 1 shows a general configuration of an information processing system 10;

FIG. 2 shows functions of a controller 25 as functional blocks;

FIG. 3 is a transition diagram showing how a Web server 30 makes transitions among stable, transient, and unstable states;

FIG. 4 shows an example of a process performed by the controller 25 for setting a throughput of the information processing system 10;

FIG. 5 shows details of a process performed at S430 in FIG. 4;

FIG. 6 is a conceptual diagram that models changes in the average response time with time by using a first-order-lag element;

FIG. 7 shows an example of control of the average response time;

FIG. 8 shows functions of a controller 25 in a variation of the present embodiment, as functional units;

FIG. 9 shows an example of a process performed by the controller 25 for setting a throughput of an information processing system 10; and FIG. 10 shows an exemplary hardware configuration of an edge server 20 according to the present embodiment or a variation thereof.

DESCRIPTION OF SYMBOLS

10 . . . Information processing system
20 . . . Edge server
25 . . . Controller
30 . . . Web server
200 . . . Response time goal obtaining section
210 . . . Average response time obtaining section
220 . . . Request count obtaining section
230 . . . Predicted response time calculating section
240 . . . Operation mode setting section

DETAILED DESCRIPTION OF THE INVENTION

Description of the Invention

The present invention provides control apparatus, information processing systems, control methods, and programs that can solve the problems. In order to solve the problems, the present invention provides a controller for controlling the average response time that elapses between the reception by an information processing apparatus of a processing request and the response of the information processing apparatus to the processing request, the controller comprising: a response time goal obtaining section for obtaining a response time goal which is a target value of the average response time; a predicted response time calculating section for calculating a predicted response time which is a predicted value of the average response time at the time point when a predetermined reference period has elapsed from setting an operation mode in the information processing apparatus, the operation mode being any of a plurality of operation modes which provide different throughputs; and an operation mode setting section for setting the operation mode in the information processing apparatus if the predicted response time calculated by the predicted response time calculating section is less than the response time goal. Thus, according to the present invention, the response time of a Web server and the like can be brought closer to a target value by reduced overhead.

While the present invention will be described below with respect to embodiments thereof, the embodiments are not intended to limit the present invention, which is defined in the claims, and not all of the combinations of features described in the embodiments are essential to the inventive solution.

FIG. 1 shows an overall configuration of an information system 10. The information processing system 10, which may be a Web system provided in an electronic commerce company, responds to a processing request from an external source. The information processing system 10 includes a Web server 30, an example of the information processing apparatus of the present invention, and an edge server 20 which controls and manages the Web server 30.

The edge server 20 transfers a processing request received from an external source to the Web server 30. If the information processing system 10 has multiple Web servers 30, the edge server 20 may select a Web server 30 to which the request is to be transferred on the basis of the workloads on the individual Web servers 30, and transfer the request to that Web server 30. The Web server 30 sends a response to the external request to the sender of the request.

The edge server 20 has a controller 25 which controls the average response time that elapses between the reception of a processing request at the Web server 30 and a response to the request. In particular, the controller 25 obtains the average response time of the Web server 30 from the Web server 30. If the average response time is longer than a target value, the controller 25 sets an operation mode that provides a higher throughput in the Web server 30. On the other hand, if the average response time is shorter than the target value, the controller 25 sets an operation mode that provides a lower throughput in the Web server 30.

The controller 25 calculates a predicted value of the average response time after a predetermined time period elapses from the previous change of operation mode and sets an operation mode that provides a predicted value less than the target value. The purpose of this is to change the average response time stably within a range around the target value while preventing the throughput from being changed excessively even if the throughput is controlled at relatively long time intervals.

FIG. 2 shows functions of the controller 25 as functional blocks. The controller 25 includes a response time goal obtaining section 200, an average response time obtaining section 210, a request count obtaining section 220, a predicted response time calculating section 230, and an operation mode setting section 240. The response time goal obtaining section 200 obtains a response time goal which is the target value of the average response time. The average response time obtaining section 210 obtains the average response time during a period from a predetermined past time to the current time at predetermined time intervals (for example 5 minutes) from the Web server 30. The request count obtaining section 220 obtains from the Web server 30 the cumulative count of processing requests received by the Web server 30. The request count obtaining section 220 also obtains the count of processing requests received by the Web server 30 per unit of time.

If the average response time is varying stably within a range, the operation mode setting section 240 sets an operation mode that provides the response time goal, regardless of the predicted response time. If the response time is varying in one direction beyond the reference range, the predicted response time calculating section 230 calculates a predicted response time which is a predicted value of the average response time at a time after a predetermined period elapses from the time at which one of operation modes that provide different throughputs is set in the Web server 30. The operation mode setting section 240 sets the operation mode in the Web server 30 if the predicted response time calculated by the section 230 is less than the response time goal. This enables the average response time to quickly approach the response time goal.

FIG. 3 is a state transition diagram showing how a Web server 30 changes among three states: stable, transient and unstable. The stable state is a state in which the average response time obtained by the average response time obtaining section 210 changes within predetermined reference limits with time. For example, after the throughput of the Web server 30 is constant over a sufficiently long period of time, the Web server makes transition to this state (S310 and S330).

The transient state is a state in which the average response time obtained by the average response time obtaining section 210 is changing in one direction beyond one of the reference limits with time. For example, if the throughput of the Web server 30 is changed lately, the Web server 30 makes transition to this state (S300).

The unstable state is a state in which the average response time obtained by the average response time obtaining section 210 is changing between a value within the reference limits and a value greater than the upper reference limit or a value less than the lower limit. For example, the Web server 30 often makes transitions to this sate if the response time increases even if the throughput is increased lately (S320 and S340).

FIG. 4 shows an example of a process performed by the controller 25 for setting the throughput of the information processing system 10. The controller 25 performs the process each time a predetermined time period elapses. First, the average response time obtaining section 210 obtains from the Web server 30 the average respond time over a period between a predetermined past time and the present time (S400). Then the operation mode setting section 240 determines whether or not changes in the average response time are within the reference limits (S410). For example, each time the average response time is obtained at S400, the operation mode setting section 240 may record and compare it with the previously recorded average response time to determine whether or not changes are within the reference range.

If the average response time changes within the reference range (for example 0.1 second) with time (S410: Within reference range), the operation mode setting section 240 performs a process for the stable state (420). In particular, the operation mode setting section 240 sets an operation mode in the Web server 30 that reduces the response time of the Web server 30 to a value less than a response time goal. For example, if the average response time changes in a range of about 1.5 seconds and the response time goal is 3 seconds, the operation mode setting section 240 decreases the throughput by a factor of 2 so that the response time immediately after the change of the operation mode becomes3 seconds. The Web server 30 makes transition to the transient state in which the average response time changes in one direction beyond one of the reference range and, after a sufficiently long period of time elapses, the average response time approaches the response time goal.

If the average response time changes in one direction beyond the reference range with time (S410: changes in one direction), then the operation mode setting section 240 performs a process for the transient state (S430). The details of this process will be described later. If the average response time changes between a value and a value greater than the upper limit of the reference range or a value less than the lower limit of the reference range with time (S410: Changes in both directions), the operation mode setting section 240 performs a process for the unstable state (S440).

In particular, the operation mode setting section 240 first obtains the maximum value of the average response times obtained over a predetermined past period of time by the average response time obtaining section 210. If the maximum value is greater than the response time goal, the operation mode setting section 240 sets an operation mode that changes the average response time equal to the maximum value to a value less than the response time goal. For example, if the maximum value is 4 seconds and the response time goal is 3 seconds, the operation mode setting section 240 sets an operation mode in the Web server 30 that reduces the throughput to 4/3. If the trend in the frequency of incoming processing requests does not change, the response time can be reduced to the response time goal.

FIG. 5 shows details of the process performed at S430 in FIG. 4. The response time goal obtaining section 200 obtains the response time goal (S500). The request count obtaining section 220 obtains from the Web server 30 the cumulative count of processing requests received by the Web server 30 (S510). The time at which the process shown in FIG. 5 is performed is denoted by $t_c$ and the obtained cumulative count of requests is denoted by n ($t_c$). The request count obtaining section 220 calculates, from the cumulative count of requests, the number of requests received by the Web server 30 per unit time (S520).

In particular, the request count obtaining section 220 subtracts the previously obtained cumulative count of processing requests from the currently obtained cumulative count of processing requests. The difference value is denoted by $n_{prev}$ ($t_c$). There quest count obtaining section 220 calculates the average of the difference value divided by the reference time period ($t_c - t_{prev}$) and the currently obtained cumulative count of processing requests divided by the lapsed time. The average is the number of processing requests received by the Web server 30 in the unit time. With the number of processing requests $m(t_c)$, this process can be represented by equation (1):

[Formula 1]

$$m(t_c) = \frac{m_{total}(t_c) + m_{prev}(t_c)}{2} = \frac{\frac{n(t_c)}{t_c} + \frac{n_{prev}(t_c)}{t_c - t_{prev}}}{2} \quad (1)$$

Then, the predicted response time calculating section 230 and the operation mode setting section 240 performs the following process for each of the multiple operation modes that can be set in the Web server 30 (S530). The predicted response time calculating section 230 calculate a predicted response time, which is the predicted value of the average response time at a time after the reference period elapsed from the time at which the current operation mode is set in the Web server 30 (S540).

More specifically, the predicted response time calculating section 230 calculates the predicted response time by using a function that models changes in the average response time with time (($r_{avg}(t)$) by using a first-order-lag element. This function can be represented by equation (2), wherein the difference between the response time of the Web server 30 when the operation mode is set ($R_{goal\pm}$) and the average response time provided in the previous stable state ($r_{avg}(t_0)$) is used as the gain and a value based on the number of processing requests per unit time and the cumulative count of processing requests is used as the time constant T.

[Formula 2]

$$r_{avg}(t) = (R_{goal\pm} - r_{avg}(t_0)) \cdot \left(1 - e^{\frac{t}{T}}\right) + r_{avg}(t_0) \quad (2)$$

The predicted response time calculating section 230 uses a value that changes in inverse proportion to the level of throughput in the operation mode as the response time ($R_{goal\pm}$) that will be provided when the operation mode is set in the Web server 30. For example, the predicted response time calculating section 230 uses the throughput for achieving the response time goal ($P_{goal}$), the response time goal ($R_{goal}$), and the throughput in the operation mode ($P_{goal\pm}$) to obtain the response time ($R_{goal\pm}$) as

[Formula 3]

$$R_{goal\pm} = \frac{P_{goal}}{P_{goal\pm}} \cdot R_{goal} \quad (3)$$

Then the predicted response time calculating section 230 determines the time constant T of the function (2) that increases the rate of change of the average response time in accordance with increase in the number of processing requests per unit time, and decrease the rate of change in accordance with increase in the cumulative count of processing requests. For example, the time constant T can be calculated by using equation (4)

[Formula 4]

$$T = \frac{n(t_c) \cdot (R_{goal\pm} - r_{avg}(t_0))}{m(t_c) \cdot (R_{goal\pm} - r_{avg}(t_c) - \Delta r)} \quad (4)$$

where $\Delta r$ is a predetermined small quantity.

With reference to FIG. 6, the process for deriving equation (4) will be described. FIG. 6 shows a conceptual diagram which models changes in the average response time with time by using a first-order-lag element. The time constant T is represented as the time required for the tangent at the origin of the curve of the first-order-lag element to reach the target value as shown in FIG. 6. The time constant can be represented by equation (5)

[Formula 5]

$$T = \frac{R_{goal\pm} - r_{avg}(t_0)}{k} \quad (5)$$

where k is the slope of the tangent.

Using the time $\Delta t$ required for the average response time to increase by $\Delta r$, k can be represented by equation (6):

[Formula 6]

$$k = \frac{\Delta r}{\Delta t} \quad (6)$$

Therefore, the time constant T can be obtained by obtaining $\Delta t$ for a particular value of $\Delta r$ (for example 0.01 msec).

The average response time $r_{avg}(t_c+\Delta t)$ at time $t_c+\Delta t$ can be represented by equation (7):

[Formula 7]

$$r_{avg}(t_c+\Delta t) = r_{avg}(t_c) + \Delta r \quad (7)$$

Because the average response time $r_{avg}(t_c)$ can be represented by equation (8), the average response time $r_{avg}(t_c+\Delta t)$ at time $t_c+\Delta t$ can also be represented by equation (9).

[Formula 8]

$$r_{avg}(t_c) = \frac{1}{n(t_c)} \cdot \sum_{i=0}^{n(t_c)-1} r_i \quad (8)$$

[Formula 9]

$$r_{avg}(t_c + \Delta_t) = \frac{1}{n(t_c + \Delta_t)} \cdot \sum_{i=0}^{n(t_c+\Delta t)-1} r_i \quad (9)$$

Here, $r_i$ is the response time to each processing request. The cumulative count of processing requests $n(t_c+\Delta t)$ at time $t_c+\Delta t$ can be approximated by equation (10) with the cumulative count of processing request per unit time m ($t_c$).

[Formula 10]

$$n(t_c+\Delta t) = n(t_c) + m(t_c) \cdot \Delta t \quad (10)$$

From equations (7), (9), and (10), equation (11) can be derived.

[Formula 11]

$$r_{avg}(t_c) + \Delta r = \frac{1}{n(t_c) + m(t_c) \cdot \Delta t} \cdot \sum_{i=0}^{n(t_c)+m(t_c)\cdot \Delta t-1} r_i = \quad (11)$$

$$\frac{1}{n(t_c) + m(t_c) \cdot \Delta t} \cdot \left( \sum_{i=0}^{n(t_c)-1} r_i + \sum_{i=n(t_c)}^{n(t_c)+m(t_c)\cdot \Delta t-1} r_i \right)$$

Because the average value of the response times over the time $\Delta t$ is $R_{goal\pm}$, equation (12) holds.

[Formula 12]

$$R_{goal\pm} = \frac{1}{m(t_c) \cdot \Delta t} \sum_{i=n(t_c)}^{n(t_c)+m(t_c)\cdot\Delta t - 1} r_1 \quad (12)$$

From equations (8), (11), and (12), equation (13) can be derived.

[Formula 13]

$$r_{avg}(t_c) + \Delta r = \frac{1}{n(t_c) + m(t_c) \cdot \Delta t} \cdot (n(t_c) \cdot r_{avg}(t_c) + m(t_c) \cdot \Delta t \cdot R_{goal\pm}) \quad (13)$$

Solving equation (13) for $\Delta t$ leads equation (14).

[Formula 14]

$$\Delta t = \frac{n(t_c) \cdot \Delta r}{m(t_c) \cdot (R_{goal\pm} - r_{avg}(t_c) - \Delta r)} \quad (14)$$

From equations (14) and (5), equation (4) can be derived.

Returning to FIG. 5, each time a predicted response time is calculated by the predicted response time calculating section 230, the operation mode settings section 240 determines whether or not the predicted response time exceeds the response time goal (S550). If the predicted response time is less than or equal to the response time goal (S550: NO), the operation mode setting section 240 selects the operation mode as a candidate operation mode to set (S560). If the predicted response time is greater than the response time goal (S550: YES), then the selection of an operation mode as a candidate operation mode (S560) is skipped. The process is repeated for each operation mode (S570).

Finally, the operation mode setting section 240 selects one of the operation modes that provide average response times less than the response time goal and sets it in the Web server 30 (S580). For example, the operation mode that provides the lowest throughput may be set. This can minimize energy consumption to the extent that the average response time is maintained at a value less than the target response for the period up to the next time the throughput is controlled.

The throughput herein may be the operating frequency of a central processing unit, for example. If an operation mode that provides a lower throughput is set, the operating frequency of the central processing unit decreases compared with an operation mode that provides a higher throughput. Consequently, the frequency of operations and therefore the power consumption in the central processing unit as well as the voltage of the central processing unit can be reduced.

The throughput is not limited to the operating frequency of the central processing unit. For example, it may be the number of central processing units allocated to a Web application program. In that case, the Web server 30 has multiple central processing units and, if an operation mode that provides a lower throughput is set, the number of central processing units allocated to the Web application program is reduced compared with an operation mode that provides a higher throughput. Consequently, the efficiency of execution of other programs executed by the other central processing units can be improved and the computing resources provided by the central processing units can be used effectively without waste.

In other examples, the throughput may be the length of a time slice during which the Web application program is given computing time of a central processing unit, or may be the priority given to the Web application program as to scheduling of execution threads. In these examples, as is the case with the operating frequency, the computing resource provided by the central processing unit can be effectively used without waste, by appropriately controlling the throughput.

FIG. 7 shows an example of controlling the average response time. Part (a) of FIG. 7 shows changes in the average response time and throughput when transition is made from a stable state to a transient state. When the operation mode is changed to reduce the throughput, the average response time gradually increases and approaches the response time goal as shown in part (a).

Part (b) shows changes in the average response time and throughput in a transient state. In the transient state, the operation mode that provides the lowest possible throughput that does not cause the average response time to exceed the response time goal after the reference period is set. Accordingly, the Web server 30 is placed in the operation mode in which the throughput is low compared with the case shown in (a). As a result, the average response time rapidly increases compared with the case shown in part (a). Thus, energy consumption can be reduced compared with the control shown in (a)

In the transient state, the controller 25 obtains the average response time and calculates a predicted response time each time the reference period lapses. The predicted response time gradually increases with time and exceeds the response time goal. Then, the controller 25 sets in the Web server 30 an operation mode that provides a higher throughput (which is indicated by the dashed line in (b)). Thus, the average response time approaches but does not exceed the response time goal.

As has been described with reference to FIGS. 1 to 7, with the information processing system 10 of the present embodiment, each time a reference time elapses, a predicted value of the average response time in the next reference period from the change of the operation mode is calculated and an operation mode that provides a predicted value less than the target value is set. This can change the average response time stably within a range around the target value while preventing the throughput from being changed excessively even the throughput is controlled at relatively long time intervals.

Experiments in which the effects of the present embodiment have been investigated has shown that the present invention can reduce energy consumption in a Web server 30 by 50% or more as compared with cases where the Web server 30 is operated at its maximum operating frequency all the time. It has been also shown that change in the energy consumption is negligibly small as compared with cases where the Web server 30 is operated at a known optimum operating frequency. In the experiments, SPECjAppServer 2002 is used as the benchmark program and the IR, which is a setting value of the frequency of processing requests, is set to 40 and 50. The Web server 30 used was a personal computer with Pentium®M1.6 GHz (Pentium is a registered trademark), on which WebSphere® application server was running (WebSphere is a registered trademark).

FIG. 8 shows functions of a controller 25 in a variation of the present embodiment as functional blocks. A Web serve 30 in the variation executes a number of application programs and a response time goal is preset for each of the application programs. That is, a target value of a response time that elapses between the reception of a processing request by an application and a response to the request is predetermined and a target value of a response time between the reception of a processing request by another application program and a response to the request is predetermined. These target values may be different from each other.

A response time goal obtaining section 200 obtains a response time goal of each application program. An average response time obtaining section 210 obtains an average response time of each application program, which is the average value of response times over the period during which the Web serve 30 is executing the application program. A request count obtaining section 220 obtains from the Web server 30 a cumulative number of processing requests received by the Web server 30 for each application program. If the average response time of any of the application programs exceeds its response time goal, a predicted response time calculating section 230 selects the application program as a program for which control is to be performed.

The predicted response time calculating section 230 calculates a predicted response time of the application program that will result when each of multiple operation modes is set in the Web server 30. If the Web server 30 is in a transient state, an operation mode setting section 240 selects the operation mode that consumes smallest energy from among operation modes that provide predicted response times less than the response time goal and sets the mode in the Web server 30. Other operations of the operation mode settings section 240 are similar to those of the operation mode setting section 240 shown in FIG. 2 and therefore the description thereof will be omitted.

FIG. 9 shows an example of a process performed by the controller 25 for setting a throughput of an information processing system 10 according to the variation of the present embodiment. The average response time obtaining section 210 obtains the average response timéof each application program (S800) and the response time goal obtaining section 200 obtains the response time goal of each application program (S810).

The predicted response time calculating section 230 determines whether or not the average response times of all application programs are less than their response time goals (S820). If the average response times of any of the application programs exceed their response time goals (S820: NO), the predicted response time calculating section 230 subtracts the average response time from the response time goal of each of the application programs that provide average response times exceeding their response time goals (S830). Then the application program in which the difference calculated is the largest among the application programs is selected as an application program for which control is to be performed.

On the other hand, if the average response times of all of the application programs are less than their response time goals (S820: YES), the predicted response time calculating section 230 selects the application program in which the difference between the average response time and the response time goal is the smallest as an application program for which control is to be performed (S840).

The controller 25 uses the average response time and response time goal of the selected application program to perform steps S850 to S880. In particular, if step S830 is performed, the operation mode is controlled with reference to the application program in which the difference between the average response time and the response time goal is the largest. If step S840 is performed, the operation mode is controlled with reference to the application program the average response time of which nearly exceeds its response time goal.

In particular, if the Web server 30 is in a transient state, the predicted response time calculating section 230 measures the predicted response time of the application program of reference that will be provided if each of the operation modes is set in the Web server 30. The operation mode setting section 240 sets in the Web server 30 an operation mode that provides a predicted response time less than the response time goal. Steps S850 to S880 are similar to steps S410 to S440 shown in FIG. 4 and therefore the description thereof will be omitted.

As has been describe with respect to the variation, the controller 25 can reduce the average response time to a value less then the response time goal even though it controls the operation modes at relatively long time intervals and therefore can obtain values such as the average response time of each individual application program. This allows the controller 25 to control the Web server 30 according to the average response time and response time goal of each individual application program.

FIG. 10 shows an exemplary hardware configuration of an edge server 20 according to the present embodiment or a variation thereof. The edge server 20 includes a CPU peripheral section including a CPU 1000, a RAM 1020, and a graphic controller 1075 which are interconnected through a host controller 1082, an input/output section including a communication interface 1030, a hard disk drive 1040, and a CD-ROM drive 1060 which are connected to the host controller 1082 through the input/output controller 1084, and a legacy input/output section including a ROM 1010, a flexible disk drive 1050, and an input/output chip 1070 which are connected to the input/output controller 1084.

The host controller 1082 connects the CPU 1000 and the graphic controller 1075, which access the RAM 1020 at higher transfer rates, with the RAM 1020. The CPU 1000 operates according to programs stored in the ROM 1010 and the RAM 1020 to control components of the edge server 20. The graphic controller 1075 obtains image data generated by the CPU 1000 on a frame buffer provided in the RAM 1020 and causes it to be displayed on a display device 1080. Alternatively, the graphic controller 1075 may contain a frame buffer for storing image data generated by the CPU 1000.

The input/output controller 1084 connects the host controller 1082 with the communication interface 1030, the hard disk drive 1040, and the CD-ROM drive 1060, which are relatively fast input/output devices. The communication interface 1030 communicates with external devices through a network. The hard disk drive 1040 stores programs and data used by the edge server 20. The CD-ROM drive 1060 reads a program or data from a CD-ROM 1095 and provides it to the input-output chip 1070 through the RAM 1020.

Connected to the input-output controller 1084 are relatively slow input/output devices such as the flexible disk drive 1050, and the input/output chip 1070. The ROM 1010 stores a boot program executed by the CPU 1000 during boot-up of the edge server 20 and programs dependent on the hardware of the edge server 20. The flexible-disk drive 1050 reads a program or data from a flexible disk 1090 and provides it to the input/output chip 1070 through the RAM 1020. The input/output chip 1070 connects the flexible disk 1090, and various input/output devices through ports such as a parallel port, serial port, keyboard port, and mouse port, for example.

A program to be provided to the edge server 20 is stored on a recording medium such as a flexible disk 1090, a CD-ROM 1095, or an IC card and provided by a user. The program is read from the recording medium and installed in the edge server 20 through the input/output chip 1070 and/or input/output controller 1084 and executed. Operations performed by the edge server 20 under the control of the program are the same as the operations in the edge server 20 described with reference to FIGS. 1 and 9 and therefore the description thereof will be omitted.

The programs may be stored in an external storage medium. The storage medium may be a flexible disk 1090 or a CD-ROM 1095, or an optical recording medium such as a DVD and PD, a magneto-optical recording medium such as an MD, a tape medium, or a semiconductor memory such as an IC card. Alternatively, a storage device such as a hard disk or a RAM provided in a server system connected to a private communication network or the Internet may be used as the recording medium and the program may be provided from the storage device to the edge server 20 over the network.

While the present invention has been described with respect to embodiments thereof, the technical scope of the present invention is not limited to that described with the embodiments. It will be apparent to those skilled in the art that various modifications or improvements can be made to the embodiment. It will be apparent from the claims that embodiments to which such modifications and improvements are made also fall within the scope of the technical scope of the present invention.

Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention. Methods may be implemented as signal methods employing signals to implement one or more steps. Signals include those emanating from the Internet, etc.

The present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A controller for controlling an average response time that elapses between reception by an information processing apparatus of a processing request and a response of information processing apparatus to the processing request, the controller comprising:

a response time goal obtaining section for obtaining a response time goal which is a target value of the average response time;

a predicted response time calculating section for calculating the predicted response time which is a predicted value of the average response time at a time point when a predetermined reference period has elapsed from setting an operation mode in the information processing apparatus, the operation mode being any of a plurality of operation modes which provide different throughputs; and an operation mode setting section for setting the operation mode in the information processing apparatus if the predicted response time calculated by the predicted response time calculating section is less than the response time goal.

2. The controller according to claim 1, further comprising an average response time obtaining section for obtaining the average response time from the information processing apparatus each time the reference period elapses;

wherein, if the information processing apparatus is in a transient state in which the average response time obtained by the average response time obtaining section changes in one direction beyond a predetermined reference range with time;

the predicted response time calculating section calculates the predicted response time which is provided if each of the operation modes is set, each time the reference time elapses; and the operation mode setting section selects any of the operation modes that provide a predicted response time less than the response time goal and sets the operation mode in the information processing apparatus, each time the predicted response time in each operation mode is calculated by the predicted response time calculating section;

wherein, if the information processing apparatus is in a stable state in which the average response time obtained by the average response time obtaining section changes within the reference range with time, the operation mode setting section sets an operation mode that changes the response time of the information processing apparatus to a value less than the response time goal to place the information processing apparatus in the transient state;

wherein if the information processing apparatus is in an unstable state in which the average response time obtained by the average response time obtaining section is changing between a value and a value greater than the upper limit of the reference range or a value less than the lower limit of the reference range with time, the operation mode setting section obtains the maximum value of the average response times obtained by the average response time obtaining section over a predetermine past period of time and sets in the information processing apparatus an operation mode that reduces the response time equal to the maximum value to a value less than the response time goal;

further comprising a request count obtaining section for obtaining the number of processing requests received by the information processing apparatus per unit time and the cumulative number of processing requests received by the information processing apparatus; and wherein the predicted response time calculating section calculates for each of the plurality of operation modes the predicted response time by using a function which models changes in the average response time of the information processing apparatus with time by using a first-order-lag element, wherein the function uses as a gain the difference between the response time that is provided when the operation mode is set in the information processing apparatus and the average response time in the stable state and uses as a time constant a value based on the number of processing requests per unit time and the cumulative number of processing requests.

3. The controller according to claim 1, further comprising an average response time obtaining section for obtaining the average response time from the information processing apparatus each time the reference period elapses;

wherein, if the information processing apparatus is in a transient state in which the average response time obtained by the average response time obtaining section changes in one direction beyond a predetermined reference range with time;

the predicted response time calculating section calculates the predicted response time which is provided if each of the operation modes is set, each time the reference time elapses; and the operation mode setting section selects any of the operation modes that provide a predicted response time less than the response time goal and sets the operation mode in the information processing apparatus, each time the predicted response time in each operation mode is calculated by the predicted response time calculating section.

4. The controller according to claim 3, wherein, if the information processing apparatus is in a stable state in which the average response time obtained by the average response time obtaining section changes within the reference range with time, the operation mode setting section sets an operation mode that changes the response time of the information processing apparatus to a value less than the response time goal to place the information processing apparatus in the transient state.

5. The controller according to claim 4, wherein if the information processing apparatus is in an unstable state in which the average response time obtained by the average response time obtaining section is changing between a value and a value greater than the upper limit of the reference range or a value less than the lower limit of the reference range with time, the operation mode setting section obtains the maximum value of the average response times obtained by the average response time obtaining section over a predetermine past period of time and sets in the information processing apparatus an operation mode that reduces the response time equal to the maximum value to a value less than the response time goal.

6. The controller according to claim 4, further comprising a request count obtaining section for obtaining the number of processing requests received by the information processing apparatus per unit time and the cumulative number of processing requests received by the information processing apparatus; wherein:

the predicted response time calculating section calculates for each of the plurality of operation modes the predicted response time by using a function which models changes in the average response time of the information processing apparatus with time by using a first-order-lag element, wherein the function uses as a gain the difference between the response time that is provided when the operation mode is set in the information processing apparatus and the average response time in the stable state and uses as a time constant a value based on the number of processing requests per unit time and the cumulative number of processing requests.

7. The controller according to claim 6, wherein the predicted response time calculating section calculates for each of the plurality of the operation modes the predicted response time by using a value inversely proportional to the throughput in the operation mode as a response time that is provided if the operation mode is set in the information processing apparatus.

8. The controller according to claim 6, wherein the predicted response time calculating section calculate the predicted response time by increasing the rate of change in accordance with increase in the number of processing requests per unit time and decreasing the rate of change in accordance with increase in the cumulative number of processing requests.

9. The controller according to claim 6, wherein the request count obtaining section obtains from the information processing apparatus the cumulative number of processing requests received by the information processing apparatus, each time the reference period elapses, subtracts the previously obtained cumulative number of processing requests from the currently obtained cumulative number of processing requests to obtain the difference, and obtains the average of the difference divided by the reference period and the currently obtained cumulative number of processing requests divided by the cumulative elapsed time as the number of processing requests received by the information processing apparatus per unit time.

10. An information processing system, comprising:

the information processing apparatus responding to a processing request received from an external source; and a controller for controlling the average response time that elapses between the reception by the information processing apparatus of a processing request and the response of the information processing apparatus to the processing request; the controller having;

a response time goal obtaining section for obtaining a response time goal which is a target value of the average response time;

a predicted response time calculating section for calculating a predicted response time which is a predicted value of the average response time at the time point when a predetermined reference period has elapsed from setting an operation mode in the information processing apparatus, the operation mode being any of a plurality of operation modes which provide different throughputs; and an operation mode setting section for setting the operation mode in the information processing apparatus if the predicted response time calculated by the predicted response time calculating section is less than the response time goal.

11. The information processing system according to claim 10, wherein the information processing apparatus executes each of a plurality of application programs;

the response time goal obtaining section obtains the response time goal of each of the application programs;

the information processing system farther comprises an average response time obtaining section for obtaining for each of the application program the average of response times over a period during which the information processing apparatus is executing the application program as the average response time; and if the average response time of any of the application programs exceeds the response time goal, the predicted response time calculating section calculates the predicted response time that is provided if any of the plurality of operation modes is set for the application program; and if the predicted response time calculated by the predicted response time calculating section is less than the response time goal, the operation mode setting section sets the operation mode in the information processing apparatus;

wherein:

if the average response time of any of the plurality of application programs exceeds the response time goal, the predicted response time calculating section selects the application program in which the difference between the average response time and the response time goal is the largest among the plurality of application programs and calculates a predicted response time of the application program that is provided if the operation mode is set in the information processing apparatus; and the operation mode setting section sets the operation mode in the information processing apparatus if the predicted response time calculated by the predicted response time calculating section is less than the response time goal of the application program wherein:

if the average response times of all of the application programs are less than the response time goals, the predicted response time calculating section selects the application program in which the difference between the average response time and the response time goal is the smallest among the application programs, and calculates a predicted response time of the application program that is provided if the operation mode is set in the information processing apparatus; and the operation mode setting section sets the operation mode in the information processing apparatus if the predicted response time calculated by the predicted response time calculating section is less than the response time goal of the application program.

12. The information processing system according to claim 10, wherein the information processing apparatus executes each of a plurality of application programs;

the response time goal obtaining section obtains the response time goal of each of the application programs;

the information processing system further comprises an average response time obtaining section for obtaining for each of the application program the average of response times over a period during which the information processing apparatus is executing the application program as the average response time; and if the average response time of any of the application programs exceeds the response time goal, the predicted response time calculating section calculates the predicted response time that is provided if any of the plurality of operation modes is set for the application program; and if the predicted response time calculated by the predicted response time calculating section is less than the response time goal, the operation mode setting section sets the operation mode in the information processing apparatus.

13. The information processing system according to claim 12, wherein:

if the average response time of any of the plurality of application programs exceeds the response time goal, the predicted response time calculating section selects the application program in which the difference between the average response time and the response time goal is the largest among the plurality of application programs and calculates a predicted response time of the application program that is provided if the operation mode is set in the information processing apparatus; and the operation mode setting section sets the operation mode in the information processing apparatus if the predicted response time calculated by the predicted response time calculating section is less than the response time goal of the application program.

14. The information processing system according to claim 12, wherein:

if the average response times of all of the application programs are less than the response time goals, the predicted response time calculating section selects the application program in which the difference between the average response time and the response time goal is the smallest among the application programs, and calculates a predicted response time of the application program that is provided if the operation mode is set in the information processing apparatus; and the operation mode setting section sets the operation mode in the information processing apparatus if the predicted response time calculated by the predicted response time calculating section is less than the response time goal of the application program.

15. A control method for controlling an average response time that elapses between reception by an information processing apparatus of a processing request and a response of information processing apparatus to the processing request; the control method comprising:

a response time goal obtaining step of obtaining a response time goal which is a target value of the average response time;

a predicted response time calculating step of calculating a predicted response time which is a predicted value of the average response time at the time point when a predetermined reference period has elapsed from setting an operation mode in the information processing apparatus, the operation mode being any of a plurality of operation modes which provide different throughputs; and an operation mode setting step of setting the operation mode in the information processing apparatus if the predicted response time calculated by the predicted response time calculating section is less than the response time goal.

* * * * *